Aug. 7, 1945.　　　　A. H. MOREY　　　　2,380,985

BEARING LUBRICATING MEANS

Filed April 20, 1944

Inventor:
Arthur H. Morey,
by Harry E. Dunham
His Attorney.

Patented Aug. 7, 1945

2,380,985

UNITED STATES PATENT OFFICE 2,380,985

BEARING LUBRICATING MEANS

Arthur H. Morey, Schenectady, N. Y., assignor to General Electric Company, a corporation of New York Application April 20, 1944, Serial No. 531,872

6 Claims. (Cl. 308—187)

The present invention relates to bearing lubricating means. It is especially useful in connection with high speed roller bearings or high speed ball bearings wherein the outer race rotates and it is this application of my invention which I have elected to illustrate and describe. It is to be understood, however, that this is only by way of example and that the invention may be utilized wherever found applicable.

The object of the invention is to provide an improved construction and arrangement of bearing lubricating means which, while effecting a flow of lubricant to the bearing sufficient to lubricate it effectively, prevents flooding of the bearing, and for a consideration of what I believe to be novel and my invention, attention is directed to the following specification and to the claims appended thereto.

Figure 1:
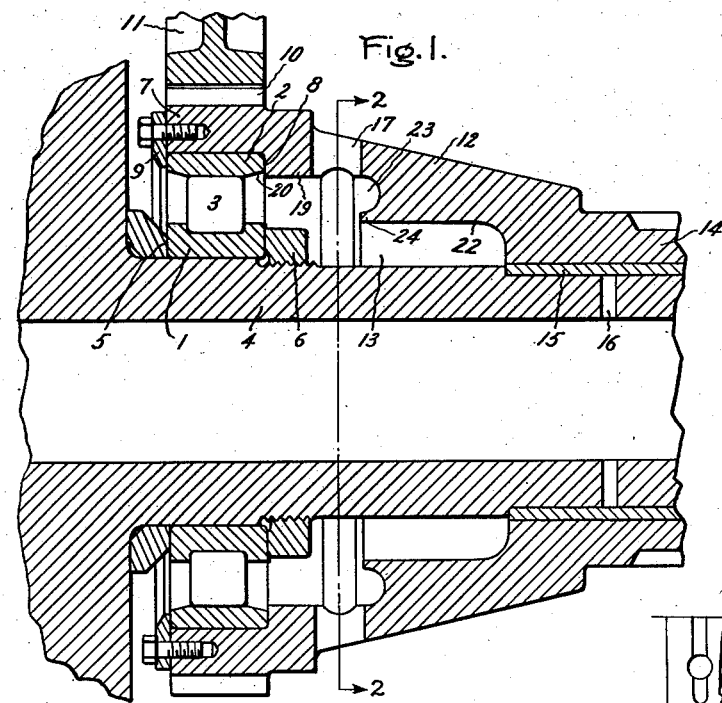
Figure 3:
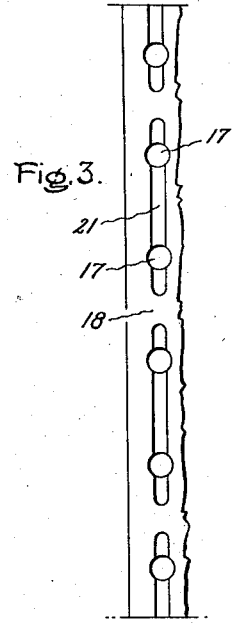
Figure 2:
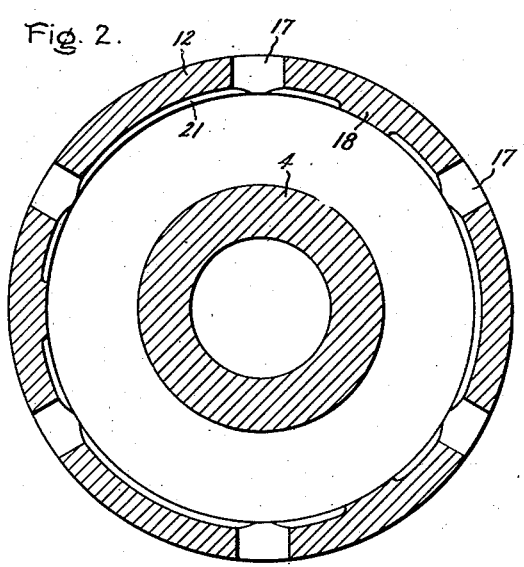

In the drawing, Fig. 1 is a sectional view of a roller bearing provided with lubricating means embodying my invention; Fig. 2 is a sectional view taken on line 2—2, Fig. 1, and Fig. 3 is a detail developed view.

Referring to the drawing, 1 indicates the inner race, 2 the outer race, and 3 the rollers of a roller bearing. The inner race is carried by a shaft 4, being positioned between the shoulder 5 and a nut 6 which threads on shaft 4. The outer race is carried by a ring 7 concentric with shaft 4, being positioned between a shoulder 8 and a holding ring 9. Ring 7 is shown as having gear teeth 10 on its outer surface and may drive a gear wheel 11. Ring 7 is formed integral with and is carried by one end of annular sleeve 12 which surrounds and is spaced radially from shaft 4 to provide an annular chamber 13. The other end of sleeve 12 is formed integral with an outer shaft 14 which surrounds shaft 4. Between shafts 4 and 14 is a sleeve bearing 15. The outer shaft 14 rotates relatively to inner shaft 4. Inner shaft 4 may be either stationary or may rotate. Bearing sleeve 15 is attached to the inner surface of outer shaft 14 and rotates on the outer surface of inner shaft 4. It is lubricated by oil supplied through hollow shaft 4 and through openings 16 in shaft 4. From the sleeve bearing, oil flows out at its one end to annular chamber 13. Thus annular chamber 13 forms a lubricant supply chamber for the roller bearing.

The volume of oil which flows from the sleeve bearing to chamber 13 may be in excess of that required by the roller bearing and my invention has to do particularly with an arrangement for limiting the amount of oil supplied to the roller bearing to just the amount required by it, the remainder of the oil being by-passed, thus avoiding flooding the roller bearing.

According to my invention, I provide in sleeve 12, somewhat in advance of shoulder 8, a series of circumferentially spaced openings 17 for discharge of oil radially outward and between some or all of said openings I provide lands 18 along which oil may creep or pass to the surface 19 just in advance of the outer bearing race 2. Surface 19 is in alignment with the inner surface of the outer race and is parallel to the axis of shaft 4. Adjacent to shoulder 8, the inner wall of the outer race is beveled outwardly to form an annular pocket 20. Referring to the developed view, Fig. 3, it will be seen that the lands 18 are defined by spaces left between circumferentially extending grooves 21 with which spaced openings 17 connect. Thus, the grooves 21 and openings 17 provide circumferentially spaced apart by-pass means for oil between which by-pass means are the lands 18. In the present instance, the inner surface of sleeve 12 is shaped to provide a surface 22 which is parallel to the axis of shaft 4 at the end of which is an abrupt right angular shoulder just in advance of openings 17 and in the surface of which is an annular groove 23 which serves to define an annular lip 24.

In operation, oil from sleeve bearing 15 flows into annular chamber 13, thus providing a continuous supply of oil to the chamber from which the roller bearing is lubricated. The oil flowing into chamber 13 is held by centrifugal force against surface 22 and flows along such surface to annular lip 24. As it passes beyond the lip 24, it is thrown radially outward by centrifugal force toward the lands 18 and grooves 21.

Since surface 22 is parallel to the axis of shaft 4, the axial velocity of the oil flowing along it is small and any residual axial velocity which the oil may have as it passes over annular lip 24 will be largely lost in impact due to centrifugal force as the oil strikes the inner surface of sleeve 12. The oil strikes the inner surface of the sleeve in the vicinity of openings 17 and grooves 21 and creeps along such surface toward the outer bearing race. There is built up on surface 19 and on the inner surface of the outer bearing race the minimum depth of oil which will produce flow through the grooves 21 and holes 17. In other words, the grooves 21 and holes 17 serve to effect the result that a film of oil of a predetermined depth is built up on the surface 19 and the adjacent inner surface of the bearing race 2 which is just sufficient to lubricate the roller bearing. Thus, the required amount of oil is supplied to the roller bearing without flooding the bearing.

It will be seen that the invention is especially applicable to bearings wherein the outer race of the bearing rotates with respect to the inner race. The lubrication of a bearing wherein the outer race rotates presents special difficulty because of the rotation of the race and the necessity of avoiding flooding of the bearing. By my invention, I provide a relatively simple means whereby just the needed amount of oil will be supplied to the bearing and flooding effectively prevented.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. In combination, a rotating shaft, a bearing the outer race of which is carried by said shaft, walls which define a lubricating oil chamber at one side of the bearing and spaced therefrom, and walls defining circumferentially spaced by-pass means for escape of oil from said chamber and between which are lands leading to the outer bearing race.

2. In combination, a rotating shaft, a bearing the outer race of which is carried by said shaft, walls which define a lubricating oil chamber at one side of the bearing, the outer wall of said chamber providing a surface along which oil may pass to the bearing, and by-pass means interrupting said surface for escape of oil before it reaches the bearing for limiting the amount of oil supplied to the bearing.

3. In combination, an inner shaft, an outer shaft, a bearing having an inner race carried by the inner shaft, a ring surrounding the inner shaft in which the outer bearing race is carried, and a sleeve which connects the ring to said outer shaft, said sleeve being in spaced relation to the inner shaft to define a lubricating oil chamber and the inner surface of said sleeve serving to convey oil from the chamber to the bearing, said sleeve in advance of the bearing being provided with openings for escape of oil passing along the inner surface of the sleeve to the bearing to limit the amount of oil reaching the bearing.

4. In combination, an inner shaft, an outer shaft, a bearing between said shafts, a second bearing in spaced relation to said first-named bearing having an inner race carried by the inner shaft, a ring in which the outer bearing race is carried, a sleeve connecting said ring to the outer shaft and providing a surface along which oil escaping from the first-named bearing may flow to the second-named bearing, and openings in said sleeve in advance of the second-named bearing for escape of oil to limit the amount of oil reaching the second-named bearing.

5. In combination, a rotating shaft, a bearing the outer race of which is carried by said shaft, walls which define a lubricating oil chamber at one side of the bearing, the outer wall of said chamber providing a surface along which oil may pass to the bearing, the inner surface of said outer wall being provided with circumferentially extending spaced grooves between which are lands for flow of oil to said outer race, and said wall being provided with openings which communicate with said grooves for escape of oil therefrom.

6. In combination, a rotating shaft, a bearing the outer race of which is carried by said shaft, and walls which define a lubricating oil chamber at one side of the bearing, the outer wall of said chamber providing a surface which is parallel to the axis of the shaft and along which oil may pass to the bearing and being provided with radially extending holes through which oil may escape whereby the depth of oil flowing along the surface to the bearing is limited to a desired minimum.

ARTHUR H. MOREY.